Sept. 15, 1970  F. W. SCHMIDT  3,528,154
INDIVIDUAL TOOTH BROACH
Filed March 28, 1968
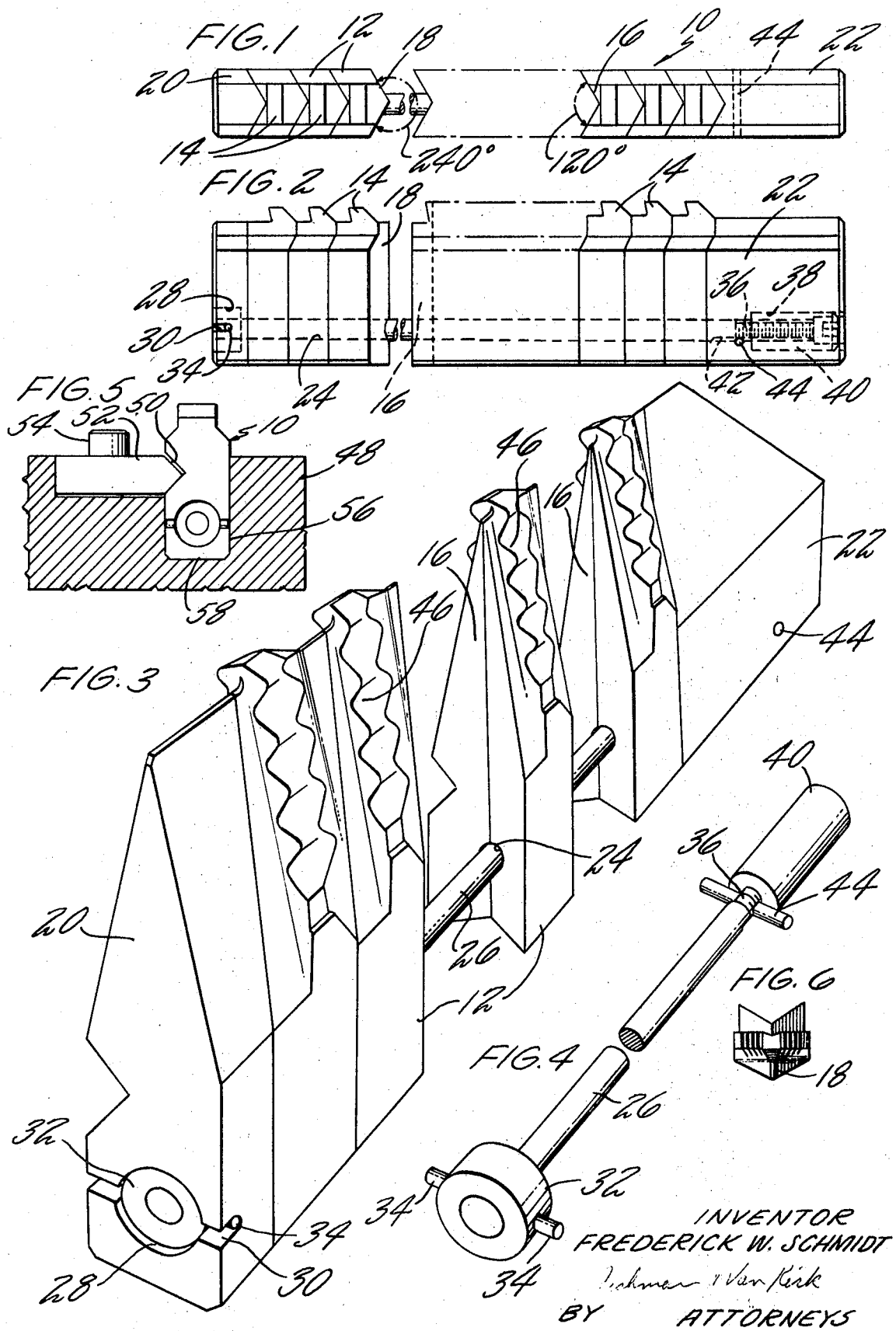
INVENTOR
FREDERICK W. SCHMIDT
BY ATTORNEYS

United States Patent Office 3,528,154
Patented Sept. 15, 1970

3,528,154
INDIVIDUAL TOOTH BROACH
Frederick W. Schmidt, 19 Windmill Hill Road,
Branford, Conn. 06405
Filed Mar. 28, 1968, Ser. No. 716,919
Int. Cl. B23p *15/42*
U.S. Cl. 29—95.1                    10 Claims

ABSTRACT OF THE DISCLOSURE

In the present disclosure a form broach is composed of a number of individual interlocking cutting elements which combine in an interdependent relationship to create the form broach. Each individual cutting element in the broach alignment interlocks with a neighboring cutting element by a male and female V-groove interlock structure which forms a part of each tooth in the assembly.

BACKGROUND OF THE INVENTION

Field of the invention

This invention relates to broaching tools. More particularly, this invention relates to multiple tooth form broaches particularly adapted for broaching slots, openings or channels of specialized cross-section. The invention is particularly useful in forming the so-called "Christmas tree" grooves in turbine discs which are used to mount similarly shaped turbine blade roots, but it will be clearly understood that the invention is not limited to forming such grooves.

Description of the prior art

The traditional prior art broaching tool has been a stick-type broach in which a number of broaching teeth or teeth sets are formed on a single solid stick. A number of particularly troublesome problems directly attributable to the unitary stick-type construction have been present in the manufacture, use and service of these traditional prior art stick-type broaches. By way of illustration of some of these problems, in the machining operation of the stick-type broaches large machines and extensive set-ups are required, and the machinery must have the capability of turning out stick-type segments of various lengths. In the heat treat operation in the manufacture of stick-type broaches a large amount of warpage is encountered due to the extensive length of the stick; cracking occurs resulting in the loss of the entire stick; and nonuniform heat treatment results due to the excessive length of the stick. In the grinding operation in the manufacture of stick-type broaches excessive grinding wheel breakdown is encountered due to the length of the stick, and small diameter wheels must be used for backoff thus leading to excessive wheel breakdown. In the assembly operation in the manufacture of stick-type broaches the quality of the overall stick form is a direct result and function of the operator's skill in forming the entire stick, with the quality of the stick being only as good as the worst tooth, and an undersized tooth results in an overloading, sometimes severely, of the next tooth. In the servicing operation in the use of stick-type broaches a substantial undersizing of a tooth, through wear or otherwise, makes it necessary to discard the entire stick even though there is still useful life left in many or all of the other teeth, and the entire stick is also lost as the result of any tooth damage or crack-up with respect to any one tooth or any one part of the stick. The choice of materials from which stick-type broaches have been made has also been restricted by the stick configuration. High-speed steel has been used, but never carbide because carbide is so expensive that a mistake could not be tolerated in forming a stick from a large piece nor could the loss of the entire tool be tolerated because of the failure of one tooth.

Attempts or suggestions have been made in the prior art to overcome some of these deficiencies in the traditional broach structure by forming a broach assembly from several broaching segments, each segment having several teeth; and suggestions have also been made to form a broach from individual teeth inserted in a holder. However, these suggestions have proven to be impracticable for a variety of reasons, principal among which have been that they have lacked the necessary stability for broaching operations and have been particularly susceptible to winking wherein the front ends of the teeth move from side to side because of pressures on the tool.

SUMMARY OF THE INVENTION

The broaching tool of the present invention is formed from a plurality of individual teeth assembled together with a V-groove interlock structure between adjoining teeth. Each tooth has a V-shaped projection on either the top or bottom surface thereof, and the other surface is provided with a correspondingly angled V-shaped notch or recess. The teeth are assembled one upon the other to construct the form broach whereby the protrusions and notches on adjacent teeth interlock, and the assembly is concluded with end structure and a tie rod passing through the base of the interlocking teeth. This construction, especially the interlocking teeth, overcomes the deficiencies encountered in the previously suggested segmented broaches thus making possible, for the first time, a practicable individual tooth segmented broach assembly which overcomes the numerous disadvantages of a stick-type broach. Considering the aspects of manufacture, use and service previously discussed with respect to the traditional stick-type broach, the individual tooth segmented broach of the present invention offers numerous advances and improvements. In the step of machining in the manufacture of the individual tooth broach, small machines can be used to turn out the individual teeth, the machines being of the type which can be automated, and all of the individual teeth can be initially cast or otherwise formed of uniform size and then ground to size in the cutting area. In the heat treat operation in the manufacture of the individual tooth broach, stick warpage is eliminated since there is no long stick to heat treat; cracking means loss of a single tooth only; and a uniform heat treat can be quality controlled for the small individual teeth. In the grinding operation in the manufacture of the individual tooth broach, wheel breakdown is controlled because only one tooth is being ground at a time, and large diameter wheels can be used for backoff because there is no adjacent tooth to run into, thus resulting in reduced frequency of wheel breakdown. In the assembly operation in the manufacture of the individual tooth broach, great selectivity can be employed in the choice of the best teeth to be used as finishers, and undersized teeth can either be eliminated or selectively placed at the start of the broach to essentially eliminate overloading due to undersizing. In the servicing of the individual tooth broach, undersized teeth can be easily removed and replaced with new teeth to extend the life of the entire broach assembly, and any one or more teeth involved in a crack-up or other tooth damage can also easily be replaced. As a further important consideration, the fact that the consequences of damage or error, either in manufacture, assembly or use, are limited to individual teeth rather than the entire stick, means that expensive but highly desirable materials such as carbide can also be used as the tooth material.

Accordingly, one object of the present invention is to provide a novel and improved form broach.

Still another object of the present invention is to provide a novel and improved individual tooth form broach.

Still another object of the present invention is to provide a novel and improved individual tooth broach in which the problems of stability and winking are overcome.

Still another object of the present invention is to provide a novel and improved individual tooth broach in which the individual teeth are assembled in a cooperating interlocking array.

Still another object of the present invention is to provide a novel and improved individual tooth broach in which the consequences of error or damage in manufacture, assembly or use are restricted to only the particular tooth or teeth damaged thereby.

Other objects and advantages will be apparent and understood from the following detailed description and drawings.

BRIEF DESCRIPTION OF THE DRAWINGS

In the drawings, wherein like elements are numbered alike in the several figures, FIG. 1 is a front view of a broach employing the present invention, the view being shown partly broken to indicate substantial length of the assembly.

FIG. 2 is a side view of the broach of FIG. 1.

FIG. 3 is a perspective view of a broach employing the present invention, the view in FIG. 3 showing several teeth removed for purposes of clarity in illustrating some of the details of the assembly.

FIG. 4 is a view showing retainer assembly structure for use in the present invention.

FIG. 5 is a view showing mounting structure for use with the present invention.

FIG. 6 is a view, looking head on, of one of the teeth of FIG. 3.

DESCRIPTION OF THE PREFERRED EMBODIMENT

Referring now to FIG. 1, a form broach 10 has a plurality of interlocking individual cutting elements in the form of tooth segments 12 extending along the greater part of the length of the broach. Not all of the teeth are shown in detail in FIG. 1, and the broach is shown broken along its length to indicate its extended length, but it will be understood that the individual tooth segments 12 are stacked one upon the other along the entire working length of the broach. The teeth depicted in FIG. 1 are roughing teeth with roughing cutting elements 14 mounted on the front ends of the teeth (see also FIG. 2). As can best be seen in FIG. 2, the cutting elements increase in size from left to right along the length of the broach so that the leftmost end of the assembly is the leading end in the broaching operation.

Viewing the assembly of FIG. 1 as lying on its side, the top surface or face of each tooth is provided with a V-groove or notch 16 along substantially the full length of the tooth, and the bottom surface or face of each tooth has a corresponding V-shaped projection 18 along substantially the full length of the tooth. The V-grooves 16 preferably have an included angle of approximately 120° as depicted, and the exterior angle of each V-projection 18 is approximately 240° as depicted so that the V-projections 18 and the V-grooves 16 mate in complete interlocking arrangement. However, it will be understood that other angles could be used in this form of interlocking arrangement. As can best be seen in FIG. 2, the grooves 16 and the projections 18 extend along substantially the entire length of each individual tooth so that the interlocking conjunction between the teeth is present along the entire length of the teeth. Since one surface of each tooth is provided with a V-projection and the other surface of the tooth is provided with a V-groove, each tooth, except the top and bottom teeth in the array, has a bottom V-projection mating and interlocking with a top V-groove in the next lower tooth, and the upper surface of each tooth has a V-groove mating and interlocking with a V-projection in the next upper tooth. The bottom surface of the lowest tooth and the top surface of the uppermost tooth do not mate with adjacent teeth, but they do mate and interlock with retaining structure as will be more fully described so that each tooth in the assembly is fully mated and interlocked at both upper and lower surfaces with appropriately shaped adjacent surfaces. Of course, it will be understood that the V-groove and V-projection arrangement could be reversed so that the projection is on the top surface of each tooth and the groove at the bottom surface of the tooth.

Still referring to FIGS. 1 and 2, and with further reference to FIG. 4, the stack of adjacent and interlocking individual cutting teeth is held together by retaining structure in the form of an interconnected lock block 20 at the top or forward end of the broach and a backup block 22 at the bottom or rear end of the broach. Lock block 20 has a V-projection at the bottom surface thereof to mate with the V-groove in the tooth segment to which it is adjacent, and backup block 22 has a V-groove in its top surface to mate with the V-projection from the tooth segment to which it is adjacent. Each tooth has a hole 24 therein near the root end of the tooth, the holes being in the same relative position in each tooth so that the holes cooperate to form a continuous passageway when the teeth are in alignment to form the broach. Lock block 20 and backup block 22 also have similarly positioned holes, and a tie rod 26 extends from lock block 20 through the roots of all of the teeth 12 and into backup block 22. Lock block 20 has a cylindrically shaped recess 28 and a pair of diametrically opposed side openings 30. A head structure attached to one end of rod 26 consisting of a cylindrical collar 32 and side wings 34 respectively fit in and engage recess 28 and side openings 30. The engagement of collar 32 and wings 34 in recess 28 and side openings 30 can also be clearly seen in the perspective view of FIG. 3. The other end of rod 26 has a threaded portion 36 which projects into a cylindrical recess 38 in backup block 22, and an elongated cylindrical set nut 40 is housed in recess 38 and screws onto threaded portion 36 to complete the retainer structure. The relative sizing of the parts is such that set nut 40 can be screwed tightly onto threaded portion 36 to urge the teeth, the locking block and the backup block together to exert an extremely high compression force along the entire broach assembly. Rod 26 is provided with a flat 42 which engages with a fixed pin 44. The engagement between pin 44 and flat 42 prevents twisting and torquing of rod 26 when nut 40 is being tightened.

The retainer structure described immediately above secures the individual teeth in an assembled relationship and provides a substantial compression force to urge the teeth together. The V-groove interlocking between successive teeth then operates to prevent any relative movement or winking between the teeth so that the assembly has all of the effect of and the advantages of a stick broach without any of the disadvantages thereof and without any of the disadvantages previously present in attempts at individual tooth assemblies.

Referring now to FIG. 3, a perspective is shown of a broach assembly in accordance with the present invention. Merely for purposes of illustration, some of the tooth segments have been omitted so that the construction of an individual tooth can be fully observed along with the relationship between the teeth. The cutting teeth shown in FIG. 3 are provided with the "Christmas tree" serrations 46 so that the broach shown in FIG. 3 is a finishing broach. Thus, it will be understood that the present invention can be employed with roughing broaches such as shown in FIG. 1 or finishing broaches such as shown in FIG. 3; and it will also be understood that any desired successive variation in shape between successive teeth can be employed so that, for example, a transition could be made from roughing teeth at one end to intermediate teeth at the other end, or from intermediate teeth to finishing teeth, or even from roughing teeth to finishing teeth if the nature of the operation permitted.

The relationship of the individual teeth 12, both between themselves and with locking block 20 and backup block 22 and rod 26 and collar 32, can be clearly seen in FIG. 3. In addition, the extension of the V-groove 16 along substantially the entire length of the tooth segments 12 can clearly be seen in FIG. 3 by virtue of the illustrative removal of some teeth, and it will be understood that the mating V-projection 18 (as seen in the tooth shown in FIG. 6) on the bottom of each tooth also extends along substantially the entire length of the tooth.

Referring now to FIG. 5, the assembled broach 10 would be mounted in a conventional ram body 48 for the broaching operation. In order to insure proper securing of the broach 10 in ram body 48, each tooth segment has 45° V-notch 50 formed on one side thereof, and a correspondingly V-shaped clamping bar fits into notch 50 and is secured to the ram body by screw 50. The interaction between bar 52 and notch 50 forces the broach assembly against surfaces 56 and 58 in the ram body to securely retain broach 10 in the ram body. Thus, additional stability is achieved.

Although the foregoing discussion has been directed to a V-groove and V-projection interlock, it will be understood that the invention is not limited to this form of interlock. Any equivalent interlock contoured shape could also be employed to provide interlocking and support between adjacent inserts along their length, such as serrations along the length of the inserts, radial surfaces along the length of the inserts or tongue and groove along the length of the inserts.

From the foregoing description and discussion it can be seen that the present invention produces a practicable and effective segmented toothed form broach composed of individual tooth segments. Broach stability is insured and winking is eliminated by the V-groove and V-projection interlock between the teeth in the broach.

While a preferred embodiment has been shown and described, various modifications and substitutions may be made without departing from the spirit and scope of this invention. Accordingly, it is to be understood that this invention has been described by way of illustration rather than limitation.

What is claimed is:

1. A segmented broach including:
   a plurality of cutting elements each of said cutting elements having a root portion and a cutting portion;
   retaining means for securing said cutting elements in a broaching array; and
   interlocking means on opposed faces of said cutting element, said interlocking means including contoured surfaces extending along substantially the full length of the root portion and cutting portion of each of said cutting elements, said contoured surfaces providing complementary interengaging portions on adjacent cutting elements in interlocking relationship in said broaching array.

2. A segmented broach as in claim 1 wherein:
   said contoured surface on one face is a V-groove and said contoured surface on the opposed face is a mating V-projection.

3. A segmented broach as in claim 2 herein:
   said V-groove has an angle of approximately 120° and said V-projection has a mating angle of approximately 240°.

4. A segmented broach as in claim 1 wherein said retaining means includes:
   a rod extending through each of said cutting elements; and
   end blocks connected to said rod, said end blocks bearing against the extreme cutting elements in said broaching array.

5. A segmented broach including:

a plurality of individual cutting elements each of said cutting elements having a root portion and a cutting portion;
   a first contoured surface on the top of each of said cutting elements, said first contoured surface extending along substantially the full length of the root portion and cutting portion of the cutting element;
   a second contoured surface on the bottom of each of said cutting elements, said second contoured surface extending along substantially the full length of the root portion and cutting portion of the cutting element, the contours of said first and second surfaces being of mating shape to provide complementary interengaging portions on adjacent cutting elements;
   said cutting elements cooperating to form an array wherein each cutting element interlocks with an adjacent cutting element in the array through engagement between one of said surfaces on each cutting element and the other of said surfaces on an adjacent cuttting element; and
   retaining means connected to and extending between the first and last cutting elements for securing all of said cutting elements in a broaching array.

6. A segmented broach as in claim 5 wherein:
   said retaining means includes first and second end blocks at opposite ends of said broaching array, one of said end blocks having one of said contoured surfaces and the other of said end blocks having the other of said contoured surfaces.

7. A segmented broach as in claim 6 wherein:
   one of said contoured surfaces is a V-groove and the other of said contoured surfaces is a V-projection;
   each cutting element other than the first and last cutting elements in said array having its V-groove surface in interlocking engagement with a V-projection of one adjacent cutting element and having its V-projection surface in interlocking engagement with a V-groove of another adjacent cutting element;
   said first cutting element in said array having one of said contoured surfaces in interlocking engagement with a mating contoured surface on one of said end blocks, and said last cutting element in said array having the other of said contoured surfaces in interlocking engagement with a mating contoured surface on the other of said end blocks.

8. A segmented broach as in claim 7 wherein:
   said V-groove has an angle of approximately 120° and said V-projection has a mating angle of approximately 240°.

9. A segmented broach as in claim 5 wherein:
   said retaining means includes first and second end blocks at opposite ends of said broaching array, each of said end blocks having a contoured surface in interlocking engagement with a mating contoured surface on the cutting element to which it is adjacent;
   an aligned opening in each of said cutting elements; and
   a rod extending through each of said aligned openings and connected to said end blocks, said end blocks and said rod cooperating to impose a compression load on said cutting elements in said broaching array.

10. A segmented broach as in claim 9 including:
    a flattened portion on said rod; and
    a pin in one of said end blocks, said pin engaging said flattened portion to prevent twisting of said rod.

References Cited
FOREIGN PATENTS 890,114    2/1962    Great Britain.
147,428    1965    U.S.S.R.

GIL WEIDENFELD, Primary Examiner

U.S. Cl. X.R.

29—95